P. BROWN AND F. J. BOSTOCK.
PROCESS OF FORMING GEARS BY GRINDING.
APPLICATION FILED NOV. 20, 1920.

1,415,016.

Patented May 9, 1922.
3 SHEETS—SHEET 1.

Inventors
Percy Brown &
Frances John Bostock
By Emery, Booth, Janney & Varney
their Attorneys

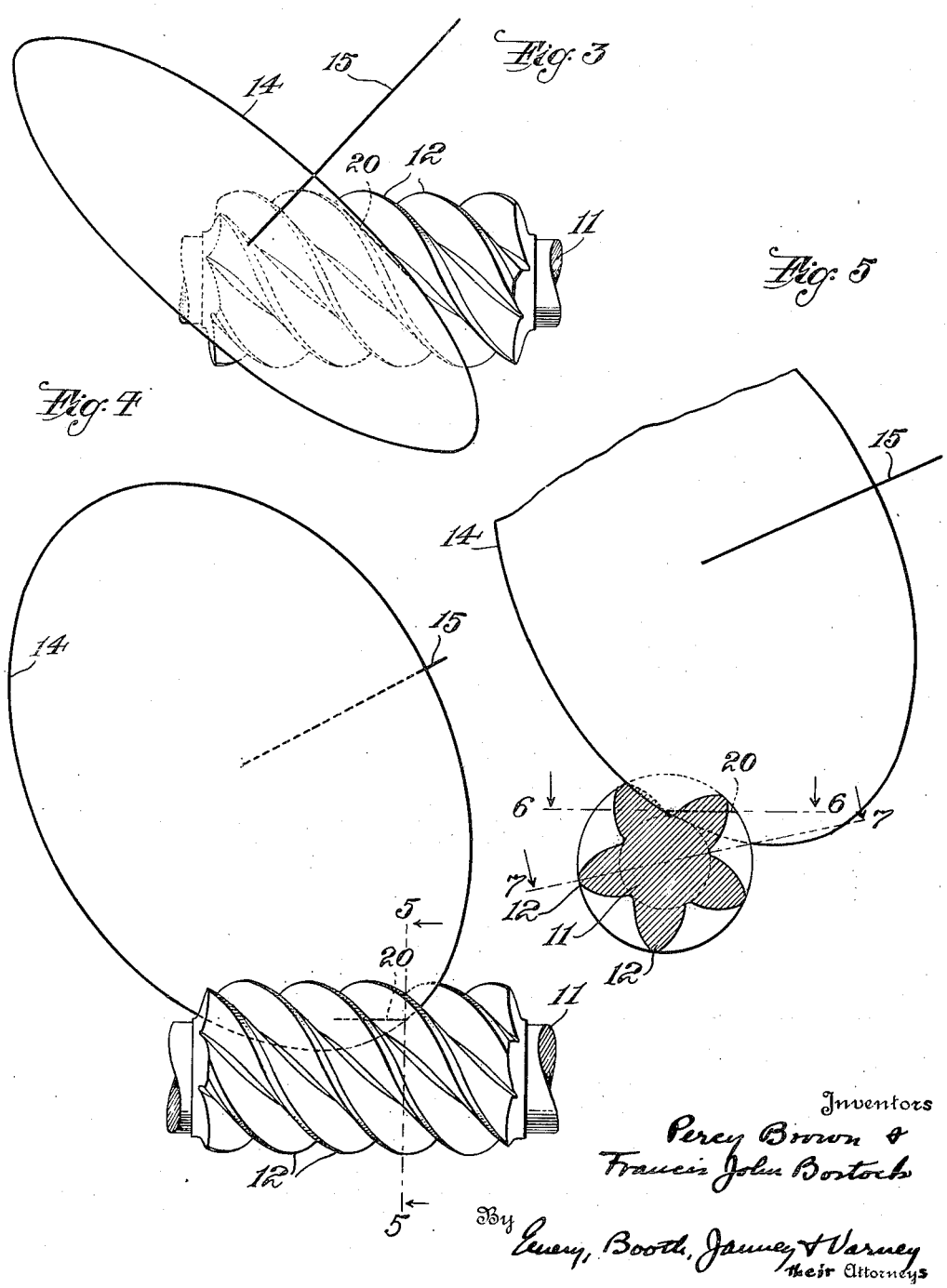

P. BROWN AND F. J. BOSTOCK.
PROCESS OF FORMING GEARS BY GRINDING.
APPLICATION FILED NOV. 20, 1920.

1,415,016.

Patented May 9, 1922.
3 SHEETS—SHEET 3.

Inventor
Percy Brown &
Francis John Bostock
By Emery, Booth, Janney & Varney
their Attorneys

UNITED STATES PATENT OFFICE.

PERCY BROWN AND FRANCIS JOHN BOSTOCK, OF HUDDERSFIELD, ENGLAND, ASSIGNORS TO TIMKEN-DETROIT AXLE COMPANY, A CORPORATION OF OHIO.

PROCESS OF FORMING GEARS BY GRINDING.

1,415,016. Specification of Letters Patent. Patented May 9, 1922.

Application filed November 20, 1920. Serial No. 425,361.

*To all whom it may concern:*

Be it known that PERCY BROWN and FRANCIS JOHN BOSTOCK, subjects of the King of Great Britain, and residing at Huddersfield, county of York, England, have invented an Improvement in Processes of Forming Gears by Grinding, of which the following description, in connection with the accompanying drawings, is a specification, like characters on the drawings representing like parts.

This invention relates more especially to grinding worm gearing to shape it to correct form after the blank has been cut to approximate form, and aims particularly to correct distortion due to hardening steel gears and to generate a correct tooth form directly by a grinding operation, utilizing a flat grinding surface which can readily be kept true.

Further objects and details of the invention will appear in connection with the following description of a preferred mode of operation as applied to a worm for automobile driving gears, utilizing any suitable worm grinding machine, such, for example, as is described in Letters Patent of the United States, No. 1,100,525, granted to us under date of June 16, 1914.

In the drawings, Fig. 1 is a top view of a grinding machine suitable for generating a worm according to the invention;

Fig. 3 is a partly diagrammatic top view of the worm and grinding wheel, drawn to a larger scale;

Fig. 4 is a similar front view of the same;

Fig. 5 is a transverse cross section of the worm on the line 5—5 in Fig. 4 looking in the direction of the arrows, likewise showing the grinding wheel diagrammatically;

In the common types of straight worm formed according to the involute system the sides of the teeth are straight where cut by radial planes lengthwise of the axis of the worm; and this common type of straight worm requires a grinding wheel having a concave face for grinding the thread, and the wheel must be reset or adjusted to a particular angle for each different pitch or lead.

Figure 6:
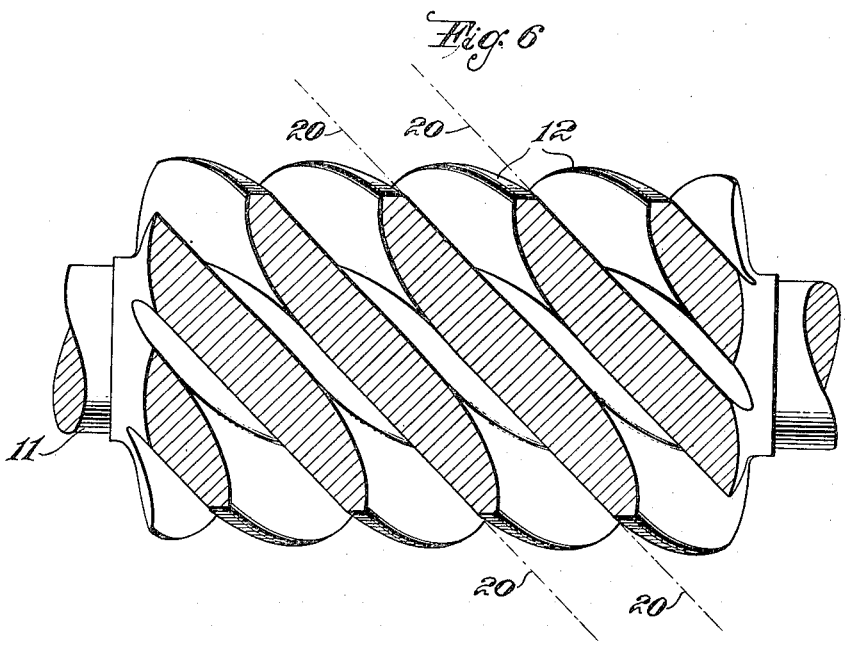
Fig. 6 is a longitudinal cross section of a portion of the worm on the line 6—6 in Fig. 5.
Figure 7:
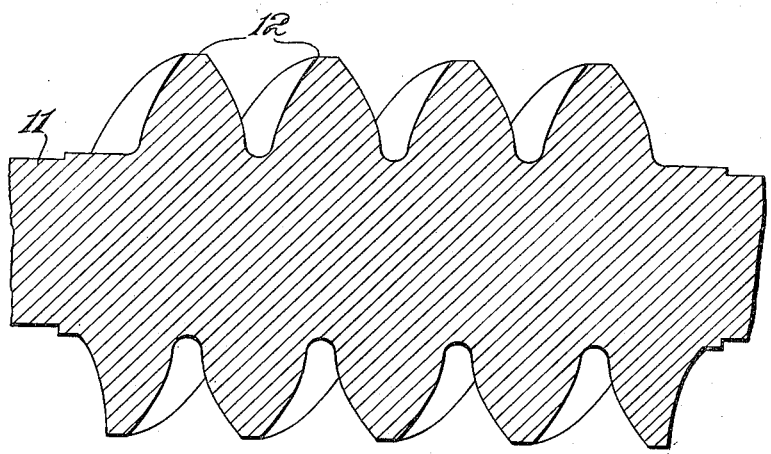
Fig. 7 is a similar view on the line 7—7 in Fig. 5, looking in the direction of the arrows.

In the type of worm produced by this invention the sides of the teeth are convex where cut by radial planes (see Fig. 7) but are straight to one hand on one side of the tooth and to the opposite hand on the opposite side where cut by planes tangent to a cylinder of substantially the same diameter as the base circle of the worm teeth (see Fig. 6).

One of the advantages of this type of worm discovered by us is that it may be produced by grinding with a flat sided grinding wheel; and another advantage is that the same angular setting of the grinding wheel may be used for grinding all pitches and leads of worms having the same tangential pressure angle, i. e., the constant angle measured in a plane tangent to the base circle between the direction of the axis of the worm and the direction of the thrust at any point of the working face in said plane.

Figure 1:
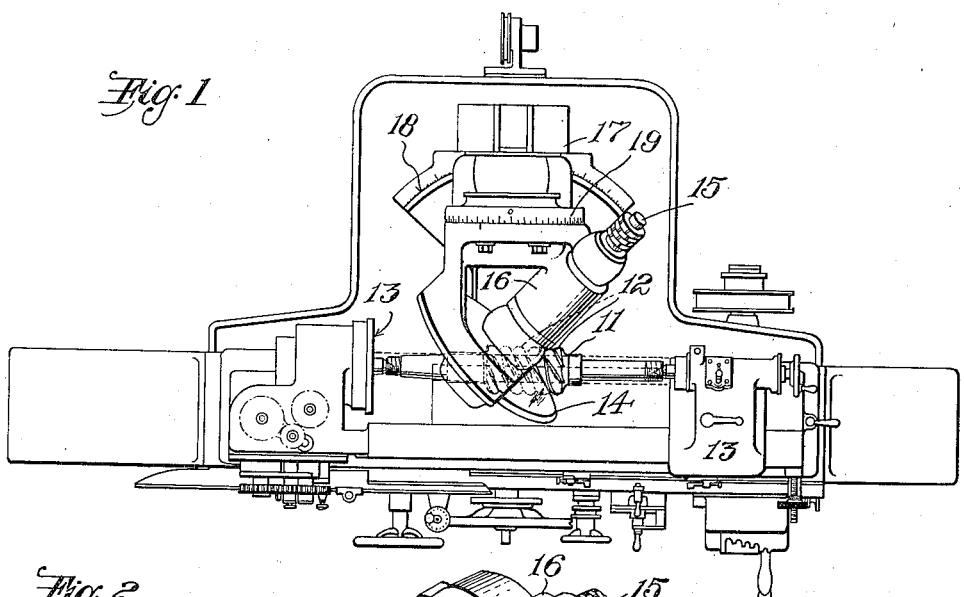
Figure 2:
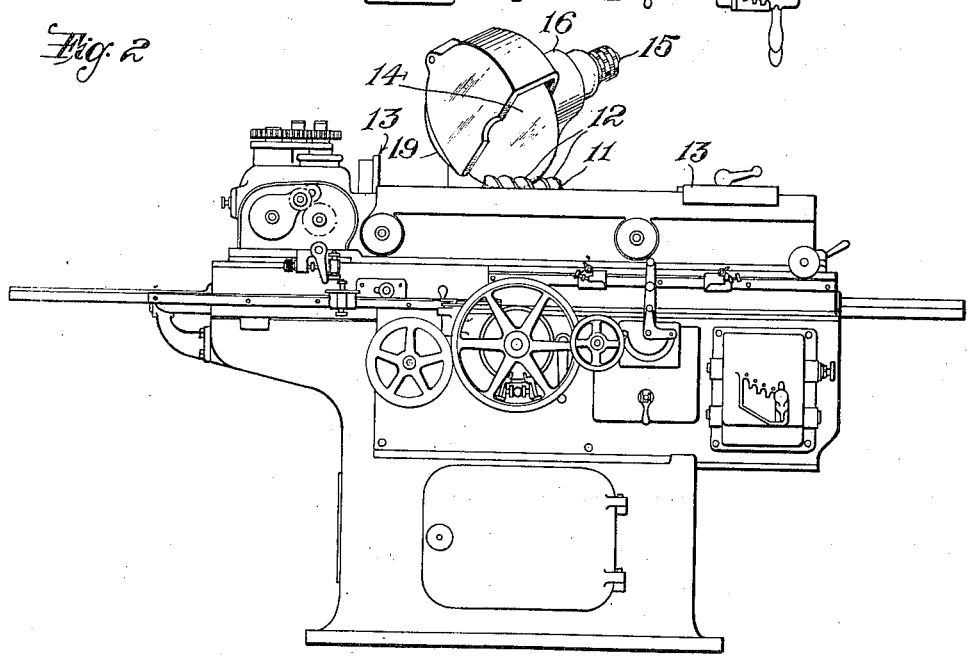
Fig. 2 is a front view of the same.

Referring to the drawings, the worm 11 therein shown has five threads or teeth 12, which are cut in a suitable thread milling machine by means of a formed cutter to approximately the desired form and after suitable heat treatment to give the steel the hardness and toughness desired, it is mounted for rotation in the sliding work holder 13 of the grinding machine, as shown in Figs. 1 and 2. The work holder is operated through suitable gearing to rotate the worm and simultaneously to move it lengthwise of its axis in synchronism with its speed of rotation and at such an axial speed that it is moved during each rotation through an axial distance corresponding to the linear lead of the threads. Automatic means are provided for reversing the directions of rotation and axial movement of the worm at the end of each passage in front of the grinding wheel, and for indexing the work periodically after each return movement to present each thread in succession to the action of the grinding wheel.

The grinding wheel 14 is mounted for rotation upon an arbor 15 carried in a head 16, which may be adjusted horizontally on the slide 17 toward and away from the axis of the worm by suitable means, and which may be set at any desired angle with respect to the horizontal and vertical by means of the graduated circles 18 and 19. The grinding wheel arbor is set so as to position the side of the grinding wheel tangent to the side of the worm thread along a line 20 extending from root to crest thereof (see Figs. 3, 4 and 5). This line may be approximately tangent to the root or base circles of the worm, and make an angle with the axis of the worm substantially like the angles of lead of the worm at the root or base circles.

Upon rotation of the flat face of the grinding wheel against first one and then the other side of the thread of the rotating and axially moving worm, the latter is ground to its true form. By reversing the worm end for end in the holder 13 the grinding wheel may be brought to bear successively against both faces of the thread without changing its angular setting.

The invention is not restricted to the instrumentalities shown and described nor to the precise form of worm illustrated. We claim the following as our invention:

1. The process of generating gears having helical teeth which comprises mounting a suitably formed gear blank for synchronous rotation and movement lengthwise of its axis with reference to a rotating forming wheel having a straight side working face, and maintaining the wheel with said working face in contact with the face of a tooth along a non-radial line extending substantially from root to crown.

2. The process of generating gears having helical teeth which comprises mounting a suitably formed gear blank for synchronous rotation and movement lengthwise of its axis with reference to a rotating forming wheel having a side working face, and maintaining the wheel with said working face in contact with the face of a tooth along a line extending substantially from root to crown approximately tangent to the base circle of the gear.

3. The process of generating gears having helical teeth which comprises mounting a suitably formed gear blank for synchronous rotation and movement lengthwise of its axis with reference to a rotating forming wheel having a side working face, and maintaining the wheel with said working face in contact with the face of a tooth along a line extending substantially from root to crown and making an angle with the axis of the gear approximately the same as the angle of lead of the root of the thread.

4. The process of generating gears having helical teeth which comprises mounting a suitably formed gear blank for synchronous rotation and movement lengthwise of its axis with reference to a rotating forming wheel having a side working face, and maintaining the wheel with said working face in contact with the face of a tooth along a line extending substantially from root to crown approximately tangent to the base circle of the gear and making an angle with the axis of the gear approximately the same as the angle of lead of the root of the thread.

5. The process of generating gears having helical teeth which comprises mounting a suitably formed gear blank for synchronous rotation and movement lengthwise of its axis with reference to a rotating member having a flat grinding face and maintaining said member with its grinding face in contact with the face of a tooth along a straight line extending from root to crown in the general direction of the length of the tooth.

6. A hardened gear having helical teeth composed of straight line elements of the shape and character produced by rotating a suitably formed hardened blank in engagement with a flat sided grinding wheel touching the side of a tooth from root to crown, and simultaneously causing synchronous relative movement of the wheel and blank lengthwise of the axis of the latter, whereby the wheel follows the helical direction of the tooth.

7. A hardened gear tooth which is shaped to a surface of straight line elements extending from root to crown tangent to the base cylinder of the gear and at an angle to its axis of the character produced by rotating a suitably formed hardened blank in engagement with a flat grinding surface disposed transversely of the axis of the gear and moving the blank lengthwise of its axis in time with its speed of rotation and conformable to the lead of the gear.

8. The process of shaping the working faces of helical gear teeth to make them convex in axial section and straight to either hand on opposite sides of the teeth where cut by planes tangent to the cylinder through their bases by grinding them with a flat sided wheel arranged at an angle to the axis of the gear such that it contacts with one or the other side of a tooth along lines tangent to said cylinder upon a helix conforming to the lead of the worm.

In testimony whereof, we have signed our names to this specification.

PERCY BROWN.
FRANCIS JOHN BOSTOCK.